Patented Nov. 22, 1927.

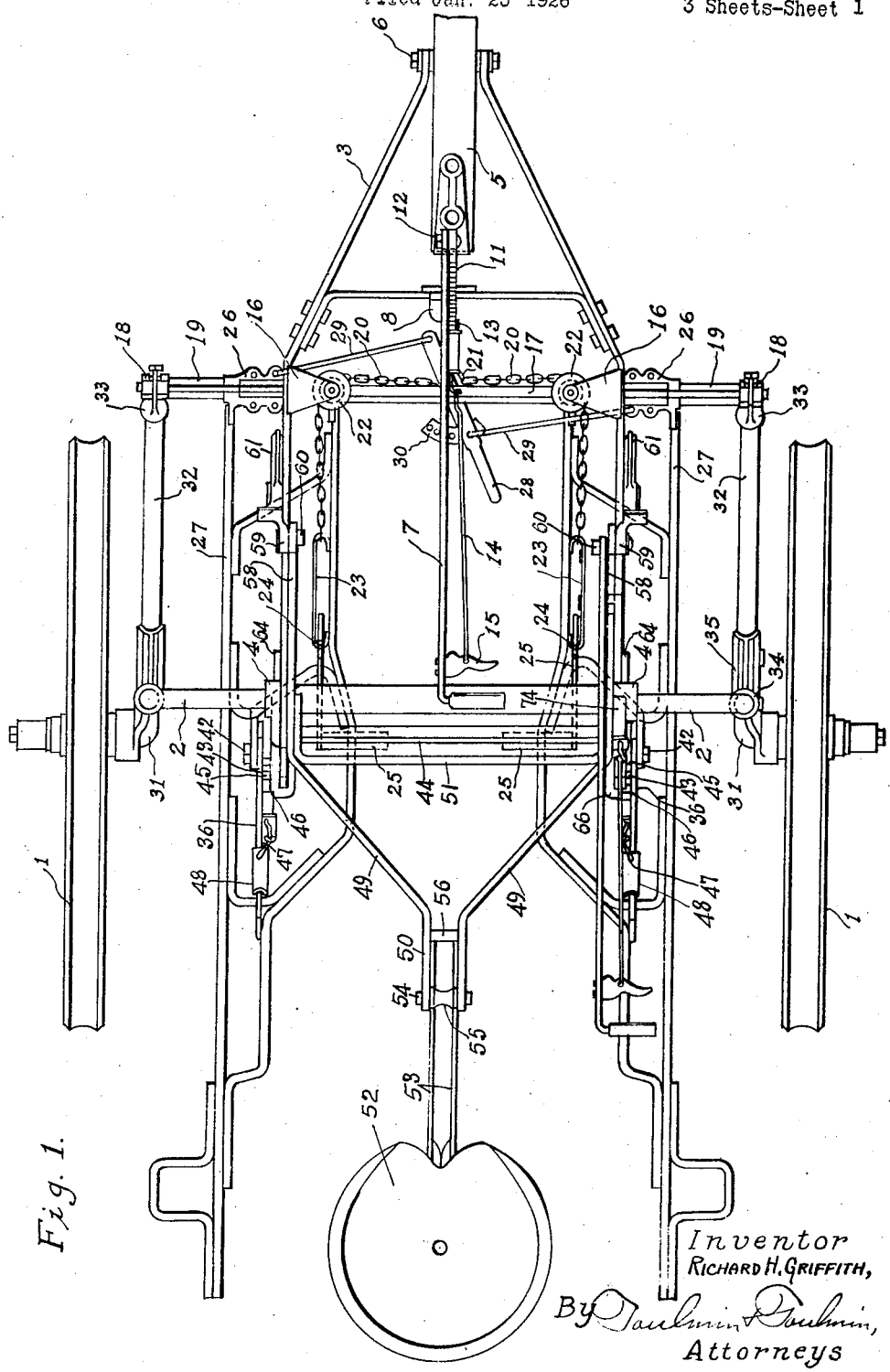

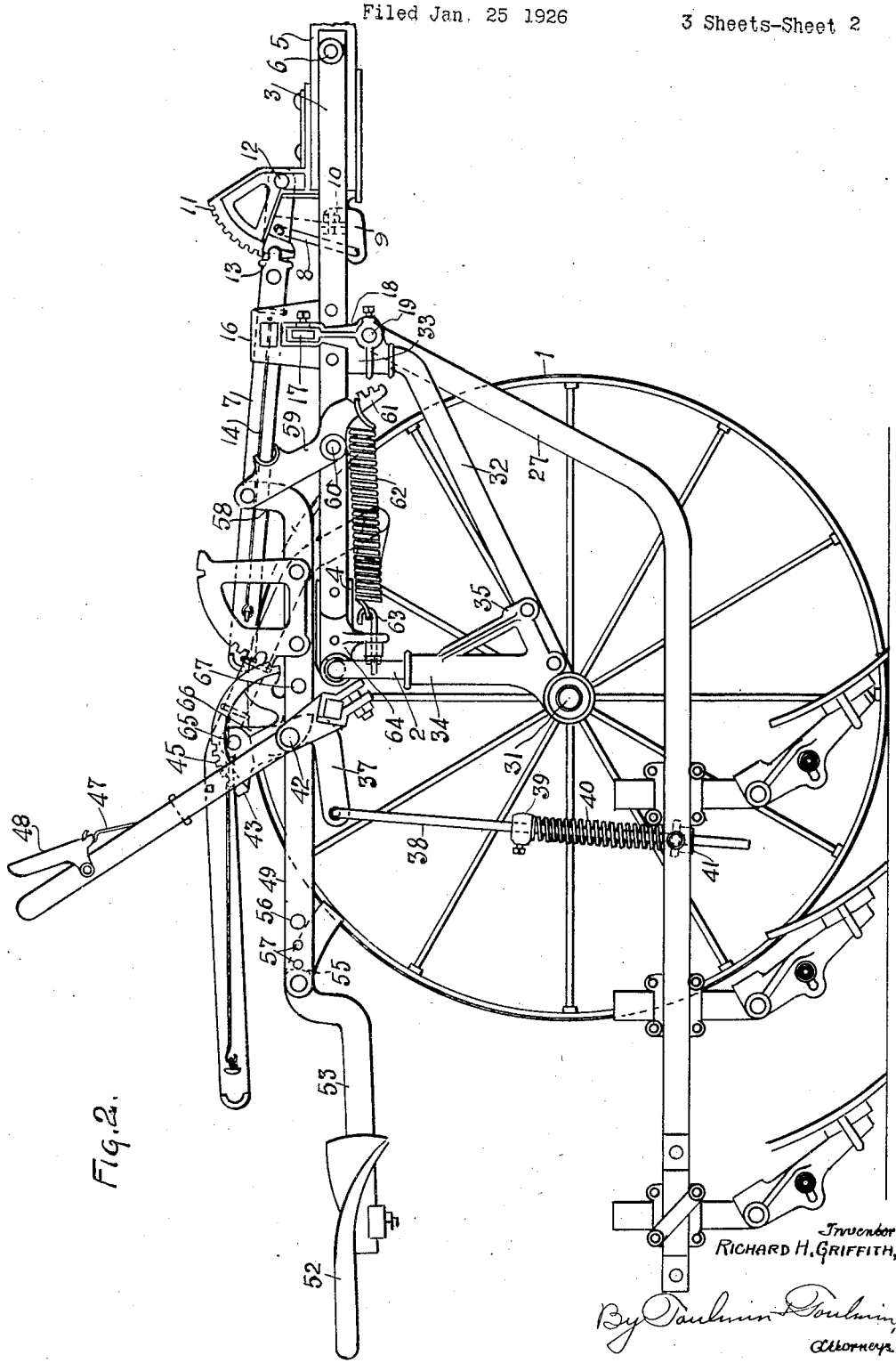

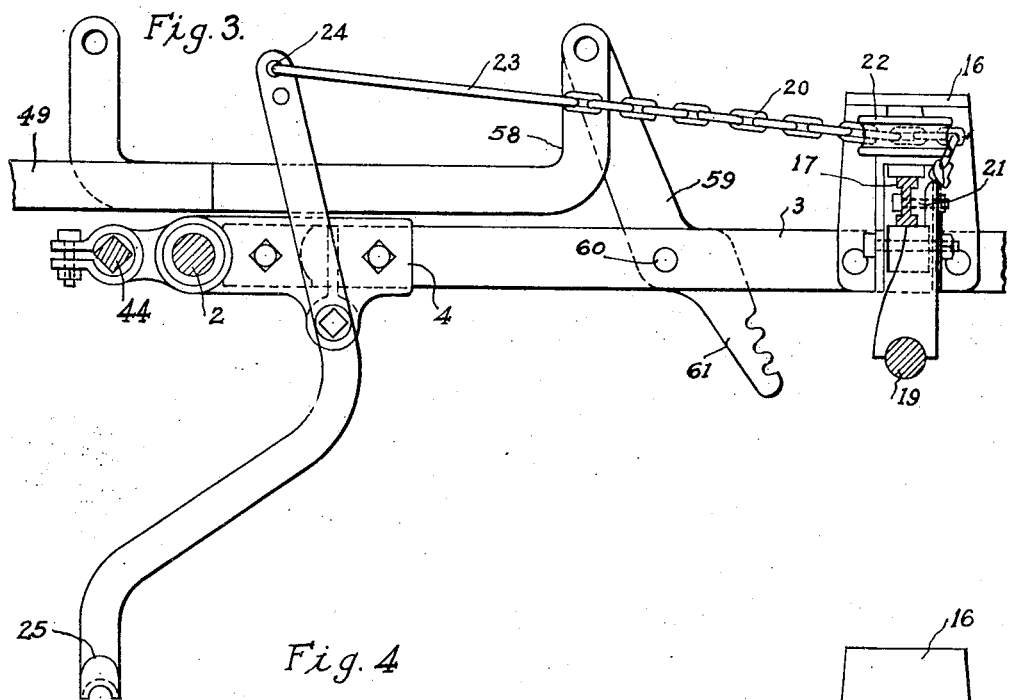
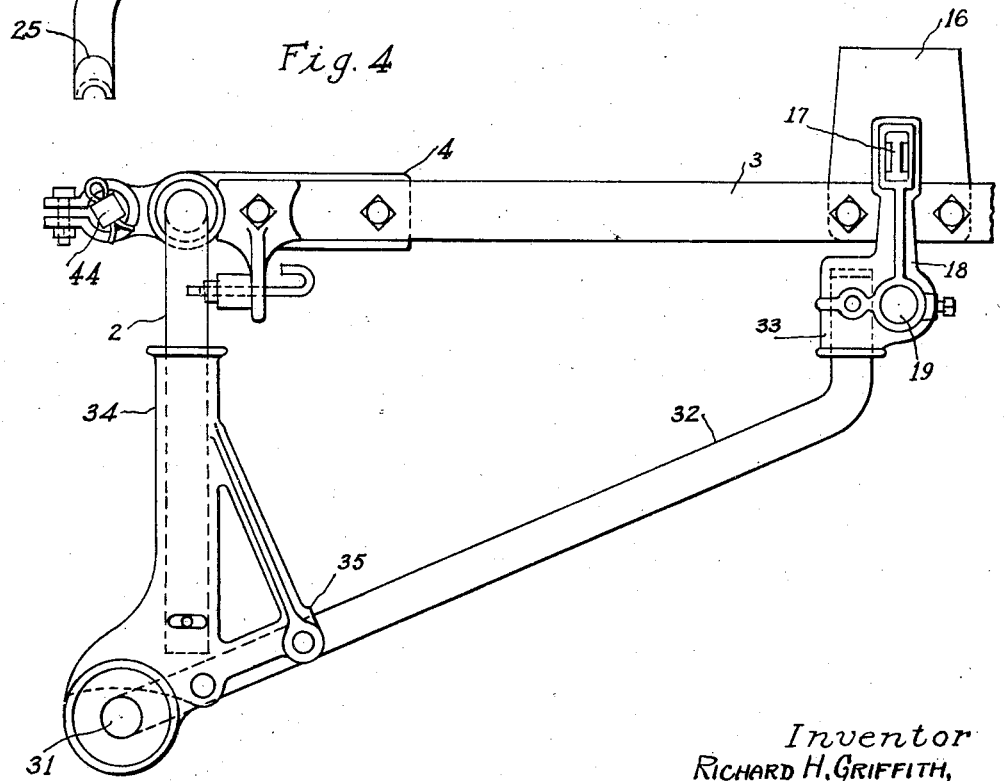

1,649,825

UNITED STATES PATENT OFFICE.

RICHARD H. GRIFFITH, OF RICHMOND, INDIANA, ASSIGNOR TO THE OHIO CULTIVATOR COMPANY, OF BELLEVUE, OHIO, A CORPORATION OF OHIO.

CULTIVATOR.

Original application filed March 7, 1925, Seria No. 13,717. Divided and this application filed January 25, 1926. Serial No. 83,596.

This invention relates to improvements in cultivators for the cultivation of fields having crops of growing corn, and is a division of my application filed March 7, 1925, Serial No. 13,717.

The present invention is kindred to that set forth in my application Serial No. 671,265, filed October 27, 1923, relating to cultivators. The features of this later invention are, essentially, the following:

1. The provision of means for laterally positioning or adjusting the shovel beams comprising, essentially a coupling shaft carried by the draft frame and on which the beams are mounted, a transverse bar adapted to manipulate said coupling shaft laterally and forward levers and chains actuated thereby and adapted to move such bar laterally in either direction, so as to adjust the beams to different lateral positions with reference to the longitudinal center of the machine; and connections between such coupling shaft and the wheel spindles to deflect the wheels at the same time the beams are laterally adjusted, so as to maintain the same general relative position of the beams to the wheels to cause the shovels carried by the beams to more readily follow the course of the machine as determined by the deflection of the wheel.

2. The provision of wheel deflecting arms or levers swiveled to the arched axle of the machine and extended to constitute spindles on which the wheel hubs are mounted, a feature I have found to insure the certain deflection of the wheels according to the position to which such arms or levers are adjusted, as well as a feature aiding in economy of production since the spindle and the deflecting arm are both in one continuous piece.

In addition to the foregoing features there are others which will appear in the body of the following specification.

Figure 1 is a plan view of my improved cultivator in its entirety.

Figure 2 is a side elevation with the seat frame in its rear position and the shovel beams in cultivating position.

Figure 3 is a detail view in side elevation more clearly showing the foot lever and chain for laterally adjusting the bar and coupling shaft, on which latter the beams are mounted.

Figure 4 is a detail view showing the wheel spindle and wheel deflecting arm or lever in one piece.

In the drawings, 1 designates a pair of ground wheels, 2 an arched axle, and 3 bars which constitute the general or draft frame of the machine. This frame is secured by brackets 4 to the arch. A draft pole 5 is connected by a pivot bolt 6 to the draft frame and is adapted to be manipulated to different positions relative to a horizontal line, for purposes of properly adjusting the angle of the shovel to the soil, by means of the lever 7 fulcrumed on a pivot link 8 carried by a bracket 9 secured to the draft frame as by a bolt or rivet 10. A segment rack 11 is secured to the pole and to the end of the lever 7 by a bolt 12. The usual detent 13 is carried by the lever 7 and manipulated through a rod 14 and hand piece 15 so as to engage or disengage with the teeth of the rack to secure the pole in different adjusted positions. When the lever is raised and lowered, its forward end raises and lowers the rack 11 and through it the pole 5.

On the frame 3 are secured a pair of guide standards 16. Adjustably mounted in these standards is a transverse bar 17 to which is secured a pair of depending brackets 18 which carry a shaft 19. These parts, the bar 17, brackets 18 and shaft 19, are laterally adjustable through the means of chains 20 each secured to the bar and shaft through a clip 21, itself fastened to the bar and shaft. These chains pass over pulleys 22 carried by the standards 16 and thence to links 23 which connect at 24 with the upper ends of the forward levers 25. The driver of the machine places his feet on these levers and by pushing upon one or the other can shift the bar 17 and shaft 19 laterally to adjust the shovel gangs to any desired lateral position with respect to the central line of the machine. To this end beam couplings 26, in the nature of sleeves, one for each beam, are mounted on the shaft 19 as more particularly seen in Figure 1. The bars 27 which comprise these beams are bolted or otherwise fastened to these coupling sleeves so that when the shaft is adjusted laterally the sleeves and beams are adjusted likewise. To keep the sleeves spaced apart at the desired distance and to connect them against moving laterally with respect to the shaft 19, a lever 28 is pivoted to the lower part of the clip 21 and is connected by links 29 to the respective sleeves 26. By manipulating the lever 28 one way or the other the sleeves with their beams are drawn closer together or positioned further apart, as may be desired. A perforated segment 30 forming a part of the clip 21 serves to lock the lever 28 in any adjusted position. For this purpose the inner end of one of the links 29 is extended far enough through the lever to enter any of the holes shown in the segment 30. In this way the lever with the sleeves and beams are held in adjusted positions. But when the bar 17 and shaft 19 are adjusted laterally through the foot levers and chains, the beams move with them as a whole.

In order that this lateral positioning of the beams may accompany the deflection of the wheels 1 from a straight line forward to either side so as to cause the machine to shift bodily in a lateral direction according to the sinuousities of the growing plants or the rows in which they are planted, I connect the wheel spindles 31 with the shaft 19 through the arms 32 which are in the nature of tillers. The connections of the arms or tillers to the shaft 19 are shown at 33 and may be of any convenient form. The tillers are pivoted to the arch 2 by means of sleeves 34 mounted on the arch and connected with the tillers by branch sleeves 35. In this manner the wheels are deflected through the manipulation of the forward levers 25 at the same time that the beams are correspondingly adjusted laterally, so that the shovels will cultivate those portions of the soil which the machine is thus directed to cover.

A particularly novel feature in this part of my machine lies in the union of the wheel spindles with the tillers, these parts being preferably made in one continuous piece, as best shown in Figure 4.

I will now refer to that branch of my machine which comprises the means for vertically positioning the shovel beams and for the fore and aft positioning of the seat frame on which the driver rides.

At 36 is shown a pair of beam positioning levers, one at each side of the machine, and each having an extension 37 to which is connected a lifting and depressing rod 38. Each of these rods extends through its beam and is adapted to be depressed so as to cause its collar 39 to force the spring 40 downward against the beam to press the shovels deeply into the soil, as when the soil is hard or the land is dry. These springs thus act as yielding pressure devices to maintain the shovels properly in the ground. A reverse movement of the rods 38 will cause them to engage at their lower end with the beams to lift the beams slightly, or more or less, as may be desired when the shovels are to cultivate lightly or in a shallow manner, or when one or both of the wheels may be running on a lower level than that of the ground where the shovels are operating, in which case it is expedient to position the beams and shovels one or both, somewhat upward. An enlargement 41 on the lower end of the rods 38 forms a convenient means for causing the rods to engage the lower faces of the beams when the rods are moved upward.

The levers 36 are fulcrumed at 42 on pins or bolts which pass through segments 43. These segments are secured firmly to a rock shaft 44 mounted in bearings which extend rearwardly from the brackets 4, so that in effect the segments are pivotally mounted on the general frame. They are provided with the usual teeth indicated at 45 adapted to be engaged by detents 46 which are manipulated by links 47 and hand pieces 48, to lock and unlock the levers in any given position with respect to the segments 43.

Referring now to the seat frame it will be observed that it is composed of side bars 49 which are drawn together at their rear ends as seen at 50 in Figure 1 and are braced together by a cross bar 51. The seat 52 has extensions 53 in the nature of arms which extend between the portions 50 of the seat frame and are pivoted thereto by a bolt 54 having a spacing block 55. A stop pin 56 carried by the parts 50 is engaged by the forward end of the arms 53 to hold the arms rigidly rearward. The stop pin may be adjusted to one or the other of the several holes indicated by dotted lines at 57 in Figure 2, to adjust the elevation of the seat to suit the particular driver. The seat may be thrown forward on the bolt 54 to shorten the machine for shipping or storage.

The forward ends 58 of the seat frame are pivoted to links 59 which themselves are pivoted at 60 to the side bars 3 of the general frame and which have extensions 61 provided with several notches with either of which the forward end of the lifting springs 62 are connected. The rear ends of these springs are fastened to hooks 63 carried by clips 64 secured also to the bars 3 of the general frame.

The seat frame bars 49 are also pivoted to the segments 43 by means of pivot bolts 65 which extend through brackets 66 which are bolted as at 67 to the seat bars. In this way the seat frame as a whole is adapted to be shifted fore and aft with respect to the draft frame and arched axle.

It will now be seen that my improved cultivator by reason of the features of invention shown and described is capable of ready and easy manipulation with respect to the course and direction of the wheels and the corresponding lateral positioning of the shovel beams.

Having thus fully described my invention, what I claim as new and desire to secure by Letters Patent, is:

1. In a cultivator, the combination with a main frame, arch and shovel beams, of a transverse shaft to which the beams are coupled, a transverse rod connected with said shaft, a chain connected therewith, pulleys lateral of said connections over which said chain passes, foot levers to which said chains are also connected, arms or tillers connected to said shaft and swiveled to said axle and having integral projections which constitute spindles for the cultivator wheels.

2. In a cultivator, the combination with an arch and a sleeve swiveled thereto and having an extension, of an arm or tiller fitted in said extension and having an integral projection which constitutes the wheel spindle.

In testimony whereof, I affix my signature.

RICHARD H. GRIFFITH.